Oct. 10, 1933.   R. STRESAU   1,930,290
ARC WELDING APPARATUS
Filed April 21, 1931   2 Sheets-Sheet 2
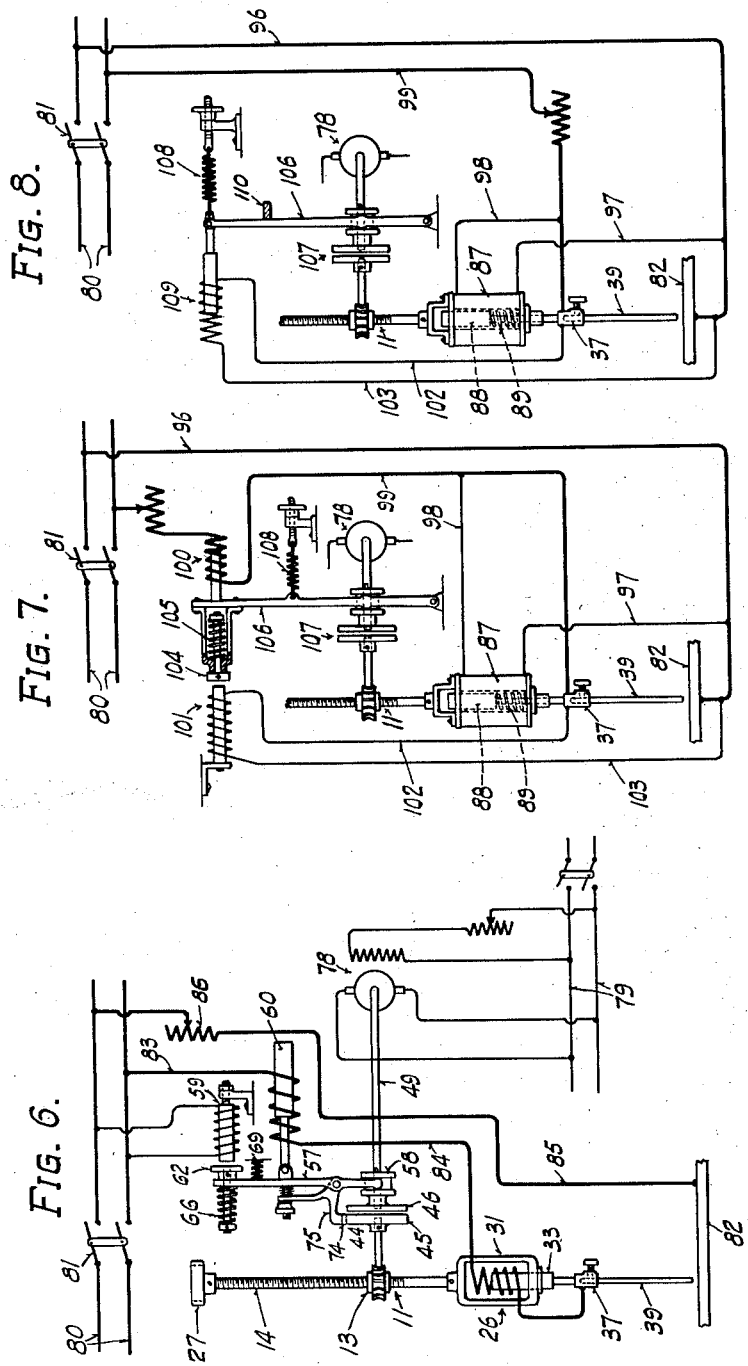
INVENTOR.
Richard Stresau
BY
ATTORNEY.

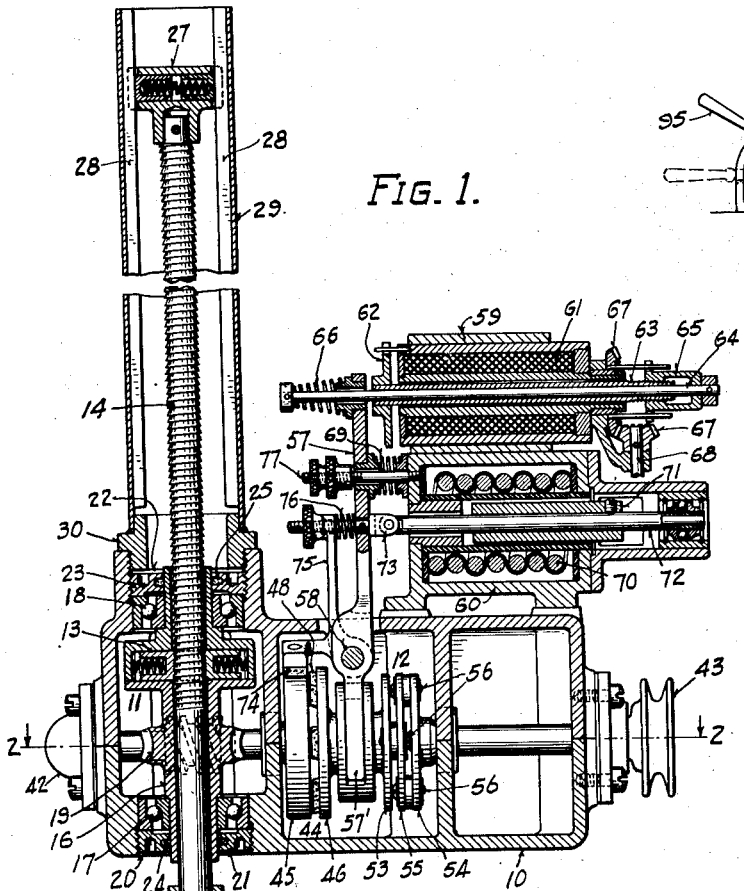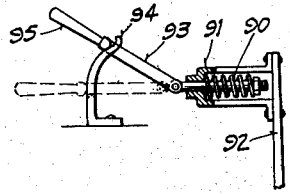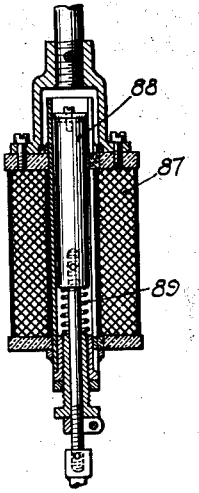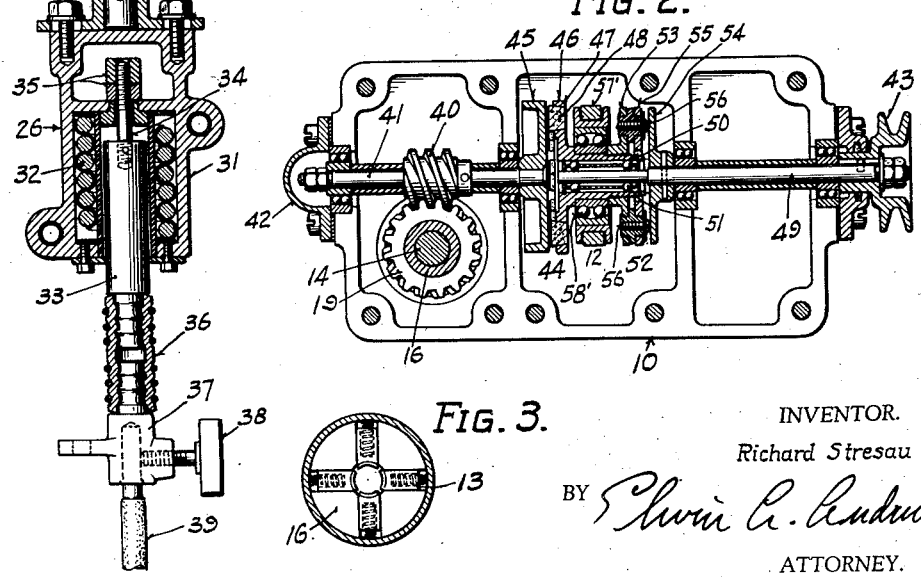

Patented Oct. 10, 1933

1,930,290

UNITED STATES PATENT OFFICE 1,930,290

ARC WELDING APPARATUS

Richard Stresau, Wauwatosa, Wis., assignor to A. O. Smith Corporation, Milwaukee, Wis., a corporation of New York Application April 21, 1931. Serial No. 531,751

26 Claims. (Cl. 219—8)

This application is a continuation in part of application Serial No. 561,305, filed May 16, 1922, covering improvements in apparatus for stabilizing arcs and controlling the feed of weld-rods.

The invention relates generally to apparatus for electric arc welding and more particularly to apparatus for controlling the feeding of the electrode to maintain an efficient welding arc.

The object of the invention generally stated is the provision of apparatus for electric arc welding that is simple and efficient in operation and may be readily and economically manufactured.

A more specific object of the invention is to provide for feeding an electrode at the proper rate to maintain an efficient welding arc for a wide range of welding conditions.

Another object of the invention is to provide for controlling a welding arc by utilizing the changing electrical characteristics of the arc to control the driving connection between the driving means and electrode feeding means.

It is also an object of the invention to provide for delivering torque impulses from the driving member to the driven means unaffected by changing operating conditions.

Other objects of the invention will appear hereinafter.

For a fuller understanding of the nature and objects of the invention, reference may be had to the following detailed description taken in conjunction with the accompanying drawings, in which:

Figure 1 is a view, partly in section and partly in side elevation, of welding apparatus constructed in accordance with this invention.

Fig. 2 is a section taken along the line 2—2 of Fig. 1, showing details of the drive for the electrode feeding means.

Fig. 3 is a top plan view of a spring biased split nut comprising a part of the feeding mechanism.

Fig. 4 is a view, partly in side elevation and partly in section, of a mechanical device for applying a biasing force to the clutch actuating lever.

Fig. 5 is a view, partly in section and partly in side elevation, of a modified form of arc striking device.

Fig. 6 is a diagrammatic view showing the circuit connections and apparatus of a welding head arranged in accordance with this invention.

Figs. 7 and 8 are diagrammatic views of modified circuit connections suitable for operating welding apparatus provided with an arc striking device similar to the one shown in Fig. 5.

Referring to the drawings and Fig. 1 in particular, the welding apparatus or head comprises a split casing 10 which encloses a feeding mechanism 11 and a drive 12. Any suitable type of a prime mover may be utilized for driving the feeding mechanism and in this instance a direct current constant speed electric motor is provided. However, it is to be understood that the conditions to be met will to a great extent govern the selection of the motor or other prime mover.

The feeding mechanism 11 comprises a spring biased split nut 13 (shown in detail in Fig. 3) which engages a feed screw 14. As illustrated, the nut 13 is disposed in an enlarged portion of a sleeve 16 which is rotatably mounted in ball bearings 17 and 18. In order to rotate the nut 13 and sleeve 16, a worm gear wheel 19 is provided on the latter.

As shown in Fig. 3, the split nut 13 comprises four spring pressed sectors disposed in the same plane to provide a substantially continuous thread. The feed screw 14 is provided with what is generally called a buttress thread and the spring pressed sectors of the split nut 13 are provided with a thread which conforms to the thread on the feed screw. The provision of the buttress thread permits the feed screw to be drawn upwardly through the nut 13 to set it for performing a feeding operation.

The left section of the casing 10 is provided with an opening 20 which in conjunction with the annular cap 21 constitutes a seat for the bearing 17. The lower end of the opening 20 is threaded to receive the threaded cap 21. An opening 22 extends through the upper wall of the casing section and the bearing 18 is mounted in this opening. A cap 23 is provided for retaining the bearing in position in the opening. As shown, the upper part of the wall defining the opening 22 in the casing 10 is threaded to receive the annular cap 23.

In order to prevent the escape of grease and oil, glands 24 and 25 are provided in the caps 21 and 23, respectively. These glands may be of any suitable type well known in the art.

The feed screw 14 extends through the sleeve and casing and an arc striking device 26 is suspended from its lower end. The feed screw 14 is mounted for longitudinal movement but is held against rotation by a cross head 27 which slides in the guides 28. In the structure illustrated, the guides 28 are supported inside of a casing 29 carried by a collar 30 which makes threaded engagement in the opening 22 provided in the upper side of the casing 10.

The arc striking device 26 comprises a frame 31 provided with two cross members on which a solenoid 32 is mounted. As shown, the coil 32 of the solenoid is seated on the lower cross member while the core 33 is suspended from the upper cross member by a stud 34 and lock nuts 35.

The core 33 is disposed for vertical longitudinal movement in the coil 32. The stroke of the solenoid may be changed by adjusting the lock nuts 35. Since the frame 31 is open, access may be readily had to the nuts 35 for the purpose of adjustment.

The core 33 extends below the lower end of the frame 31 and is provided with a corrugated projection for receiving a flexible coupling 36. An electrode clamp 37 is mounted in the lower end of the flexible coupling 36. The electrode clamp may be of any suitable type and in this instance a clamp provided with a set screw 38 for engaging an electrode 39 is utilized.

A suitable arc striking device is disclosed in my Patent No. 1,407,900, issued February 28, 1922. The electrical connections for actuating the arc striking device and the manner in which it functions will be described hereinafter.

Any suitable type of a drive may be provided for operating the feeding mechanism 11. In this particular embodiment of the invention, a worm drive is utilized for rotating the nut 13 to actuate the feed screw 14.

As shown in Fig. 2, the worm gear wheel 19 meshes with a worm gear 40. The worm gear is carried by a shaft 41 which extends through the end walls of the left chamber of the casing 10 and is supported in ball bearings seated in the walls of the chamber. In order to facilitate access to the chamber, the opening for receiving the end bearing is extended through the wall and a removable cap 42 is mounted over it.

As pointed out hereinbefore, an electric motor will preferably be utilized to operate the feeding mechanism. However, in Figs. 1 and 2, only a grooved pulley 43 that may be driven by a belt is illustrated. The purpose of utilizing the belt drive is to facilitate the changing of the speed ratio between the motor and pulley by changing the size of either the driving pulley provided on the motor or the pulley 43. It is intended that the pulley 43 represent a belt drive, the speed ratio of which may be changed by changing the size of the pulley.

In order to control the speed at which the worm drive is operated, a clutch 44 is interposed between the worm gear 40 and the pulley 43. The clutch comprises clutch members 45 and 46 which are actuated relative to one another to establish or interrupt a driving connection.

The clutch member 45 may be made from any suitable material having the proper coefficient of friction. For my purposes, I have found that steel is satisfactory. As illustrated in Fig. 1, the clutch member is provided with a laterally extending rim which is utilized as a brake drum. The clutch member 45 is press-fitted on the end of the shaft 41 so as to provide a driving connection for the worm gear 40.

As will be observed, the clutch member 46 comprises a plate 47 having a number of openings therein arranged in a circle near its periphery. Corks 48 simulating conic frustums are mounted in the openings in the plate 47 with the large ends presented to the plate 45.

It has been found that a clutch member of this type has substantially the same coefficient of friction and torque transmitting capacity for varying conditions of the surfaces of the clutch members resulting from the collection of oil and dirt thereon and over the range of temperatures experienced in performing welding operations with this type of apparatus. Therefore, the conditions under which the torque is transmitted from the driving motor to the feeding mechanism remain substantially constant for all changes in temperatures encountered.

The clutch member 46 is mounted in such a manner that it will offer little resistance during its operation into and out of engagement with the clutch member 45. As shown, the clutch member 46 is supported on the shaft 49 which is rotatably mounted in the casing 10 by means of ball bearings seated in the cross walls. In order to mount the clutch member for longitudinal movement relative to the shaft 49, it is provided with a long hub 50 which receives balls 51. The balls may be retained in position in any suitable manner and in this instance it is retained in the hub by means of rings which engage in internal circumferential grooves in the hub 50. The inner end of the shaft 49 is of reduced diameter and supports the balls 51. When the clutch member 46 is moved longitudinally relative to the clutch member 45, it is carried by the balls 51 which ride on the shaft 49.

The driving connection between the clutch member 46 and the shaft 49 comprises a flexible coupling shown generally at 52. The coupling comprises two plates 53 and 54 rigidly connected to the hub 50 and shaft 49, respectively. The plates 53 and 54 are connected by a flexible annular member 55 which is preferably made from leather but may be made from any other suitable flexible material. The annular member 55 is connected to the plates by means of bolts 56. As will be observed, the bolts 56 are spaced angularly 90° in the annular member 55 and 180° in the plates 53 and 54. The bolts connecting the one plate to the annular member 55 are staggered with relation to the bolts connecting the other plate to it.

Since the movement of the clutch member 46 to perform clutching operations need only be a few thousandths of an inch, this type of flexible coupling which offers a negligible resistance to extension is suitable.

In order to operate the clutch member 46, an actuating lever 57 is provided. As shown, the actuating lever is pivotally mounted on a pin 58 carried by depending lugs provided in the casing 10. The actuating lever 57 engages the hub 50 of the clutch member 46 through a self aligning bearing 58' which carries a grooved outer member for receiving the depending prongs 57' of the fork provided on the lower end of the actuating member.

The lower end of the clutch actuating lever when operated describes an arc of a circle. In order to permit the lever to move freely the bearing 58' is constructed to permit a movement of the outer raceway relative to the inner raceway and may be described as a self aligning bearing. As shown, the outer raceway is provided with an inner face simulating a sector of a sphere. Therefore the bearing 58' will readily accommodate itself to the position of the lever 57. The bearing when rotating offers substantially no resistance to the movement of the clutch actuating lever 57.

Further, the prongs 57' of the actuating lever 57 fits snugly in the grooved member carried by the bearing. As a result, there is substantially no lost motion between the actuating member 57 and the clutch member 56.

In order to successfully operate arc welding apparatus, provision must be made for feeding the electrode at varying rates to compensate for the changes in the welding conditions. In the present welding apparatus, the speed of feeding the electrode is controlled by means of the clutch 44. Since it is desired to vary the speed to meet changing arc conditions, provision is made for operating the clutch in response to some characteristic of the arc.

As shown in Fig. 1, two electro-magnets 59 and 60 are provided and mounted on the casing 10 adjacent the clutch actuating lever 57. The electro-magnet 59 is connected across the constant voltage power source for the welding circuit while the electro-magnet 60 is connected in series circuit relation with the electrode as will be explained hereinafter.

The electro-magnet 59 is provided with a coil 61 and an armature 62. The armature is supported on a sleeve 63 slidably mounted in the coil. A rod 64 extends through the sleeve 63 and an opening in the upper end of the clutch actuating lever 57. This rod is adjustably connected to the sleeve 63 by means of the nut 65.

A spring 66 is interposed between the upper end of the clutch actuating lever 57 and the left end of the rod 64. Therefore when the coil 61 is energized and the armature 62 drawn to the right, the spring 66 is compressed to bias the clutch actuating lever 57 to the right and the clutch member 46 into engagement with the clutch member 45.

In order to facilitate the setting of the rod 64 relative to the sleeve 63, a pair of bevel gears 67 is provided for rotating the nut 65 on the threaded end of the sleeve 63. A long rod 68 is provided for operating the bevel gears 67. The gears and the rod 68 may be arranged to extend to a place accessible to the operator. The adjustment of the nut 65 provides for varying the compression of the spring 66.

When the coil 61 is deenergized, the clutch 44 is maintained open by a spring 69 disposed between the casing of the electro-magnet 60 and the actuating lever 57. In other words, when the coil 61 is deenergized, the spring 66 is released and the biasing force of the light spring 69 assures that the clutch 44 stands open.

The electro-magnet 60 comprises a coil 70 made from a conductor capable of carrying the welding current and a core 71 which, in this instance, is a sleeve. As shown, the core 71 is connected to a rod 72 by a set screw and both are mounted for frictionless longitudinal movement in the coil 70. The right end of the rod 72 is supported on balls while the left end of the rod is connected to the clutch actuating lever 57 through a knuckle joint 73. This knuckle joint is provided since at the point of connection the clutch actuating lever when it moves describes an arc of a circle. Therefore with a pivoted joint 73 the lever may move freely without binding.

The core 71 is slidably mounted on the rod 72 so that it may be adjusted relative to the coil 70 to adapt the machine for a wide range of welding currents. If it is desired to use the apparatus for welding currents around 100 amperes, the core will be set to provide a short air gap, while if it is desired to weld with currents as high as 800 amperes, the core will be disposed to provide a longer air gap. In this manner, the apparatus may be adjusted to impose substantially the same actuating force on the lever 57 when welding with 800 amperes as when welding with 100 amperes and thereby utilize substantially the same amount of compression in the spring 66 for all operations. This adapts the apparatus for operation over a wide range of welding conditions such as using high amperage with large sized covered electrodes or low amperages with small sized bare electrodes.

In order to obtain a positive and quick response of the feeding mechanism, a brake is provided for stopping the clutch member 45 the instant the driving connection is interrupted. The brake comprises a brake shoe 74 faced with cork in a manner similar to clutch member 46, and a bell crank 75. The bell crank is pivotally mounted on the same pin as the clutch actuating lever 57. Further, as shown, the bell crank is disposed to be actuated by the core 71. The brake actuating force is transmitted from the core through the rod 72, the knuckle joint 73, the clutch actuating lever 57, and a spring 76 which is disposed between the actuating lever 57 and the upper end of the bell crank. The spring is retained in position between the bell crank and lever 57 by means of a threaded extension on the knuckle joint 73. Provision is made for adjusting the bell crank relative to the actuating lever 57 to facilitate the setting of the brake.

It has been found in practice that the cork face of the brake shoe 74 becomes distorted if continually subjected to excessive operating forces. As shown in Fig. 1, a stud 77 is provided and mounted in the casing of the electro-magnet 60 and disposed to extend through an opening in the actuating lever 57. Lock nuts are provided on the outer end of the stud and disposed about two-thousandths of an inch from the actuating lever 57 when the clutch stands in its open position and the brake shoe 74 engages the drum 45. Therefore in the operation of the brake when it is moved from its—off position—to its maximum—full braking position—it is protected from excessive pressures by limiting the movement of the lever 57 and interposing the cushioning spring 76 between the two levers.

Referring now to Fig. 6, a direct current shunt motor is shown directly connected to the shaft 49. This is merely for the purpose of simplifying the illustration and, as pointed out hereinbefore, the motor is preferably connected to the shaft through a belt and driving pulley 43. This is for the purpose of getting the desired speed ratio between the motor and shaft 49. The motor may be operated from any suitable power source such as a 110 volt line 79 which is provided in many shops for lighting purposes.

The welding current may be obtained from any suitable constant voltage power source such as the power busses 80 generally specially provided for welding. The voltage most suitable for welding apparatus of this type is in the neighborhood of 60 volts. The electrical connections of the apparatus will be more readily understood if they are explained as required during the description of the operation.

The electro-magnet 59 is connected across the busses 80 and arranged so that its energization and deenergization are controlled by the operation of the switch 81 provided for controlling the welding circuit. Assuming that the motor 78 is running, and that the switch 81 is actuated to connect the welding circuit, then the electro-magnet 59 is energized and draws the armature 62 to the right, compressing the spring 66. As a result, a biasing force is imposed on the clutch actuating lever 57 and the clutch 44 is closed.

The feeding mechanism 11 is operated and the electrode 39 fed toward the work 82. When the electrode touches the work, a welding circuit is established which may be traced from the lower bus 80, through conductor 83, the actuating coil of the electro-magnet 60, conductor 84, the actuating coil of the arc striking electro-magnet 26, electrode 39, work 82, conductor 85, and the ballast resistor 86, back to the other bus 80. The electro-magnets of the arc striking device 26 and the clutch actuating mechanism respond immediately. The electro-magnet 60 moves the clutch actuating lever 57 to the left, operating the clutch and disconnecting the driving connection between the motor 78 and the feeding mechanism 11, while the electro-magnet of the arc striking device draws the core 33 and the electrode 39 upwardly a predetermined distance. The movement of the electrode 39 away from the work strikes an arc and the welding process is started. At the same time that the clutch 44 is opened, the brake is applied to the clutch member 45 stopping the feeding mechanism.

As the arc is struck and the metal of the electrode begins to fuse and deposit upon the work, there is a decrease in the arc current resulting in a decrease in strength of the electro-magnet 60, and the biasing force of the spring 66 effects a release of the brake 74 and a closure of the clutch 44. The feeding mechanism is again set in operation and the electrode advanced toward the work.

As the welding process continues, the welding apparatus responds to the changing conditions of the arc and governs the rate of feed of the electrode to maintain an efficient arc for depositing the weld metal. The operation of the clutch is rapid, the interruption of the driving connection taking place a number of times per second in resonance with very rapid fluctuations in the welding current.

The brake arrests the rotation of the clutch member 45 when the driving connection is interrupted. During the operation of the welding apparatus, the cycles of engagement and release of the clutch are extremely rapid, which frequency may be as high as 40 cycles per second, thereby giving a very closely regulated feed of the weldrod. It has been found that this frequency of the clutch system remains substantially constant during welding and that the more important changes in the welding current above or below the predetermined current value effect a change in the relative energy input of the driving impulses and braking impulses of the system, thereby determining the rate of feed of the electrode and tending to maintain the predetermined current value.

As explained hereinbefore, the function of the electro-magnet 59 is to compress the spring 66 and thereby impose a biasing force on the clutch actuating lever 57. It is also pointed out that mechanical means may be utilized for compressing the biasing spring.

The mechanical spring biasing device illustrated in Fig. 4 comprises a spring 90 disposed in a stirrup 91 which is connected to the clutch actuating lever 92. One member of the articulated linkage 93 extends through an opening in one end of the stirrup and through the spring 90. The member which extends through the spring is provided with a nut so that when it is drawn longitudinally out of the stirrup, it compresses the spring 90. A forked cam 94 is disposed to receive a handle 95 provided on the outer member of the linkage 93. The nut may be adjusted to control the tensioning of the spring.

When the handle 95 is pressed downwardly, it is carried away from the stirrup compressing the spring 90. In this manner a biasing force may be impressed on the clutch actuating lever 92.

The modified type of arc striking device, shown in Fig. 5, is controlled by a voltage coil 87 connected across the arc gap during starting, as shown in Figs. 7 and 8. A core 88 is supported in the coil 87 by a coil spring 89. When the coil 87 is not energized, the core 88 stands in the position illustrated. The operation of the arc striking device, shown in Fig. 5, will be explained in connection with Figs. 7 and 8.

Referring to Fig. 7, assuming that the motor 78 is operating and that the control switch 81 is actuated to connect the welding circuit, then a voltage is impressed across the actuating coil 87 of the arc striking device. The energizing circuit for the coil 87 may by traced from the upper bus 80, through conductors 96 and 97, a coil 87, conductors 98 and 99, series coil 100, back to the lower bus. Upon the energization of the coil, the core 88 is drawn downwardly, compressing the spring 89. In mounting the core 88, provision is made for permitting a stroke that is sufficient for striking an arc of the proper length.

Simultaneously with the energizing of the coil 87, a voltage is impressed across the electro-magnet 101. As a result, the armature 104 is drawn to the left compressing the biasing spring 105. A biasing force is now imposed upon the clutch actuating lever 106 which is greater than the pull exerted by the spring 108. Consequently, the clutch 107 is closed establishing a driving connection between the motor 78 and the feeding mechanism 11.

When the electrode 39 engages the work 82, the welding circuit is established and the coil 87 is shunted, reducing the voltage impressed across it to almost zero. The spring 89 then functions to project the core 88 upwardly and draw the electrode 39 away from the work striking an arc.

After the arc is struck, the feed of the electrode during welding is regulated in the same manner as hereinbefore described with respect to the system of Fig. 6.

The electro-magnet 101 comprises a coil of sufficient turns to effect the compression of the spring 105 even when energized by a voltage which is only a small fraction of the maximum arc voltage. As a result, the spring 105 is compressed when the welding operation is initiated and remains compressed as long as the welding operation continues.

The welding system disclosed in Fig. 8 is the same as that disclosed in Fig. 7 with the exception that no spring biasing coil is provided and the spring 108, which may be made of any desired strength, is directly opposed to a voltage coil provided on the electro-magnet 109. In order to obtain the desired operation of the clutch, the voltage coil of the electro-magnet 109 is designed to respond rapidly to changes in the voltage across the arc.

The frequency of operation of the clutch in this system is substantially the same as for the systems of Figs. 6 and 7 and the regulation of the electrode feed is substantially as sensitive but responds to rapid fluctuations in the voltage across the arc instead of to the similar fluctuations in welding current as employed in the systems of Figs. 6 and 7. As shown, a stop 110 is provided to limit the movement of the lever 106 under the biasing force of the spring 108.

The arc is struck in the system shown in Fig. 8 in the same manner as in the system shown in Fig. 7. Therefore a description of the functioning of the arc striking portion of the system is considered unnecessary. The circuit connections shown in Fig. 8 are suitable for welding with current from generators of constant current characteristics.

Since numerous changes may be made in the above described structures, and circuit connections, and different embodiments of the invention may be made without departing from the spirit and scope thereof, it is intended that all matter contained in the above description or shown in the accompanying drawings shall be interpreted as illustrative and not in a limiting sense.

I claim:

1. In a welding machine for feeding an electrode to perform arc welding operations, in combination, means for feeding the electrode, a motor for driving the feeding means, a clutch for establishing a connection between the feeding means and the motor, means responsive to a characteristic of the arc for operating the clutch to control the connection between the feeding means and the motor to regulate the rate of feeding of the electrode, and a brake disposed to arrest the feeding of the electrode when the clutch is opened.

2. In a welding machine for feeding an electrode to perform arc welding operations, in combination, means for feeding the electrode, a motor for driving the feeding means, a clutch for controlling the connection between the feeding means and the motor, means responsive to a characteristic of the arc for operating the clutch to control the connection between the feeding means and the motor to regulate the rate of feeding of the electrode, a brake disposed to arrest the feeding of the electrode when the clutch is opened, and means for striking an arc when the electrode is fed into contact with the work.

3. In a welding machine for feeding an electrode to perform arc welding operations, in combination, means for feeding the electrode, a motor for driving the feeding means, a clutch for controlling the connection between the feeding means and the motor, means responsive to a characteristic of the arc for operating the clutch to control the connection between the feeding means and the motor to regulate the rate of feeding of the electrode, and means operating independently of said feeding means for striking an arc when the electrode is fed into contact with the work.

4. In a welding machine for feeding an electrode to perform arc welding operations, in combination, means for feeding the electrode, a motor for driving the feeding means, a single clutch for controlling the connection between the feeding means and the motor, means responsive to a characteristic of the arc for operating the clutch, and a brake disposed to arrest the feeding means when the clutch is opened to permit the reestablishment of the desired arc characteristic by the fusing and depositing of the electrode metal, said brake and clutch being disposed to cooperate for controlling the feeding operations.

5. In a welding machine for feeding an electrode to perform welding operations, in combination, means for feeding the electrode, a constant speed motor for driving the feeding means at a speed greater than the rate of fusion of the electrode, a single clutch for controlling the connection between the feeding means and the motor, means responsive to a characteristic of the arc for operating the clutch, a brake disposed to arrest the operation of the feeding means when the clutch is opened to permit the reestablishment of the desired arc characteristic by the fusing and depositing of the electrode metal, said brake and clutch being disposed for substantially simultaneous cooperative operation, and means independent of the feeding means for striking an arc when the electrode is actuated into contact with the work.

6. In a welding machine for feeding an electrode to perform welding operations, in combination, means for feeding the electrode, a motor for driving the feeding means, a clutch disposed between the feeding means and the motor, means for biasing the clutch to closed position to establish a connection between the motor and electrode feeding means, means responsive to a characteristic of the arc for actuating the clutch to interrupt the driving connection between the motor and the electrode feeding means, and a brake disposed for substantially simultaneous operation with the clutch to cooperate in controlling the feeding operations.

7. In a welding machine for feeding an electrode to perform welding operations, in combination, means for feeding an electrode, a motor for driving the electrode feeding means, a single clutch for connecting the motor and feeding means to move the electrode, means for biasing the clutch in a predetermined direction, an electro-magnet opposed to the biasing means, the electro-magnet and biasing means being disposed to control the operation of the clutch as the characteristics of the arc vary, a brake for arresting the feeding means to permit fusion of the electrode tending to maintain predetermined arc characteristics, and means for striking an arc when the electrode is actuated into contact with the work by the feeding means.

8. In a welding machine for feeding an electrode to perform welding operations, in combination, motor driven means for feeding the electrode at a speed greater than the rate of fusion, a circuit for supplying current to the electrode, means responsive to the establishment of the welding circuit for striking an arc, said arc striking means being disposed to function independently of the feeding means, and means responsive to a characteristic of the arc and operating at high frequencies for arresting the movement of the electrode to effect an electrode feed substantially equal to the rate of fusion, thereby tending to maintain an arc of predetermined characteristic continuously during the welding operation.

9. In a welding machine for feeding an electrode to perform welding operations, in combination, means for feeding the electrode, a motor for driving the feeding means, a circuit for supplying current to the electrode, and means interposed between the feeding means and the electrode for striking an arc, said arc striking means being responsive to the establishment of the welding circuit and the flow of current and disposed to function independently of the motor driven electrode feeding means.

10. In a welding machine for feeding an electrode to perform welding operations, in combination, means for feeding an electrode, a motor for driving the feeding means, a clutch for controlling the connections between the motor and feeding means, an electric circuit for supplying current to the electrode, means for striking an arc interposed between the feeding means and the electrode and disposed to respond to the establishment of the welding circuit and the flow of welding current, and means responsive to a characteristic of the arc to control the operation of the clutch.

11. In a welding machine for feeding an electrode to perform welding operations, in combination, means for feeding the electrode, a welding circuit for supplying current to the electrode, means for striking an arc interposed between the feeding means and the electrode, the arc striking means being responsive to the establishment of the welding circuit and the flow of welding current, and means responsive to a characteristic of the arc for controlling the feeding means to give a rate of feed substantially equal to the rate of fusion of the electrode.

12. In a welding machine for feeding an electrode to perform welding operations, in combination, means for feeding the electrode, a motor for operating the feeding means, a clutch interposed between the feeding means and the motor, means for actuating the clutch to interrupt the driving connection, and means for arresting the feeding means when the driving connection is interrupted, said clutch and means being provided with engaging faces having a substantially constant coefficient of friction for all operating conditions.

13. In a welding machine for feeding an electrode to perform welding operations, in combination, means for feeding an electrode, a motor for driving the electrode feeding means, a clutch having relatively movable clutch members interposed between the motor and feeding means, and a flexible joint interposed between the motor and the clutch to permit relative movement of the clutch members to perform clutching operations.

14. In a welding machine for feeding an electrode to perform welding operations, in combination, means for feeding the electrode, means for driving said feeding means at a constant speed, means for establishing a connection between the driving and feeding means, means for biasing the connecting means to a predetermined position to establish a connection between the driving and feeding means, a welding circuit disposed to be established through the feeding of the electrode, means independent of the feeding means and responsive to the establishment of the welding circuit for moving the electrode in a direction opposite to the direction of feeding to draw an arc, and means responsive to a characteristic of the arc for actuating the connecting means to control the feeding of the electrode.

15. In a welding machine for feeding an electrode to perform welding operations, in combination, a welding circuit, means for feeding the electrode at a constant speed, said feeding means being disposed to close the welding circuit after the feeding of the electrode is initiated, a single clutch for driving said feeding means, said clutch being provided with contacting faces having a coefficient of friction which remains substantially constant irrespective of changes in the welding conditions, and means independent of the feeding means responsive to the closing of the welding circuit for drawing an arc.

16. In a welding machine for feeding an electrode to perform welding operations, in combination, a geared drive for feeding an electrode, a motor for actuating the geared drive to feed the electrode at a constant speed, a clutch interposed between the motor and geared drive, means for braking the geared drive, said braking means being disposed to be actuated when the clutch is operated to disconnect the motor and geared drive to arrest the feeding of the electrode, and means responsive to changes in the rate of feeding relative to the rate of fusion of the electrode for actuating the clutch to disconnect the motor and geared drive and actuate the braking means.

17. In a welding machine for feeding an electrode to perform welding operations, in combination, means for feeding the electrode, means for driving the feeding means at a constant speed, a clutch interposed between the feeding means and driving means, means for biasing the clutch to its closed position to establish a driving connection to effect the feeding of the electrode, means for energizing the biasing means to initiate the operation of the welding apparatus and means associated with the biasing means for causing the clutch to stand in its open position.

18. In a welding machine for feeding an electrode to perform welding operations, in combination, means for feeding the electrode, means for driving the feeding means at a constant speed, a clutch interposed between the feeding means and driving means, means for biasing the clutch to its closed position to establish a driving connection to effect the feeding of the electrode, means for energizing the biasing means to initiate the operation of the welding apparatus, and means responsive to the current flowing in the welding circuit for actuating the clutch against the biasing force to interrupt the driving connection.

19. In a welding machine for feeding an electrode to perform welding operations, in combination, means for feeding the electrode, a motor for driving the electrode feeding means at a constant speed, a clutch interposed between the motor and the electrode feeding means to establish a driving connection, a welding circuit for supplying a welding current to the electrode, means disposed to be actuated upon the energizing of the welding circuit to impose a biasing force on the clutch to close it to establish a driving connection and effect the feeding of the electrode, and means responsive to a characteristic of the welding current for actuating the clutch against the biasing means to interrupt the driving connection.

20. In a welding machine for feeding an electrode to perform welding operations, in combination, means for feeding the electrode, a motor for driving the electrode feeding means at a constant speed, a clutch for establishing a driving connection between the motor and the electrode feeding means, a welding circuit for supplying welding current to the electrode, a switch for controlling the welding circuit, means for biasing the clutch to its closed position disposed to be actuated in response to the closure of said switch, and means responsive to a characteristic of the current flowing in the welding circuit for actuating the clutch to its open position against the force imposed on the clutch by said biasing means.

21. In a welding machine for feeding an electrode to perform welding operations, in combination, a power source, means for feeding the electrode, a motor for driving the feeding means, a clutch interposed between the motor and feeding means to control the feeding of the electrode, a welding circuit for supplying a welding current to the electrode, an electro-magnet connected in parallel circuit relation with the welding circuit, means for connecting the welding circuit and electro-magnet across the power source, and means for biasing the clutch to a closed position disposed to be energized when the electro-magnet is connected across the power source.

22. In a welding machine for feeding an electrode to perform welding operations, in combination, means for feeding an electrode, a motor for driving the electrode feeding means at a constant speed, a clutch interposed between the motor and feeding means for establishing a driving connection, a welding circuit for supplying current to the electrode, means for biasing the clutch to its closed position to establish a driving connection, an electro-magnet connected to respond to the welding current to actuate the clutch against the biasing force, said electro-magnet and biasing means being arranged to open and close the clutch upon changes in the welding current, and means for varying the magnetic reluctance of the electro-magnet to permit the use of the welding apparatus over a wide range of welding currents and maintaining the same sensitive response of the biasing means and electro-magnet to effect the operation of the clutch upon changes in welding current.

23. In a welding machine for feeding an electrode to perform welding operations, in combination, means for feeding the electrode, a motor for driving the feeding means, a clutch interposed between the motor and the feeding means for establishing a driving connection, a welding circuit for supplying current to the electrode, and means for actuating the clutch comprising means for biasing the clutch to a predetermined position, an electro-magnet opposed to the biasing means, said electro-magnet being connected to respond to changes in the welding current, and means for controlling the response of the electro-magnet to the welding current to permit the use of a wide range of welding currents without affecting the sensitivity of the clutch actuating means.

24. In a welding machine for feeding an electrode to perform welding operations, in combination, means for feeding the electrode, a motor for driving the feeding means at a constant speed, a clutch interposed between the motor and the feeding means to establish a driving connection, means for biasing the clutch to its closed position to establish a driving connection, means for actuating the clutch to its open position upon the development of predetermined welding conditions, means for braking the feeding means disposed to be actuated by the clutch actuating means, and means for limiting the force that may be applied to the braking means.

25. In a welding machine for feeding an electrode to perform welding operations, in combination, means for feeding the electrode, a motor for driving the electrode feeding means, a clutch having a movable clutching member interposed between the motor and feeding means, and a flexible axially movable coupling interposed between the motor and the movable clutch member to permit the desired movement of said clutch member to perform clutching operations.

26. In an arc welding apparatus, a welding circuit embracing the work and a weldrod, and an axially movable solenoid to the core of which one end of the weldrod is connected, means for closing the welding circuit to energize the solenoid to move the weldrod toward the work, means for feeding the solenoid with the weldrod to contact the point of the latter with the work and shunt the solenoid, means carried by the solenoid to retract the weldrod to strike an arc, the said feeding means thereafter acting to continue the feeding movement of the solenoid and weldrod, and means operated by variations in the welding current to control such feeding movement.

RICHARD STRESAU.